United States Patent [19]

Wolfe, Jr. et al.

[11] Patent Number: 5,424,521
[45] Date of Patent: Jun. 13, 1995

[54] ARTICLE CHECKOUT SYSTEM WITH PRICE PARAMETER OVERRIDE CAPACITY

[75] Inventors: Donald M. Wolfe, Jr., Coral Springs; John C. Allard, Boca Raton; Cuong H. Nguyen, Coral Springs; Larry E. Axsom, Boca Raton; Jerry D. Gabbard, Deerfield Beach, all of Fla.

[73] Assignee: Checkrobot, Inc., Deerfield Beach, Fla.

[21] Appl. No.: 852,552

[22] Filed: Mar. 17, 1992

[51] Int. Cl.⁶ .............................. G06F 17/60
[52] U.S. Cl. .................... 235/383; 364/405
[58] Field of Search ............ 235/383, 375; 364/403, 364/404, 405

[56] References Cited

U.S. PATENT DOCUMENTS

| | | | |
|---|---|---|---|
| 3,688,087 | 8/1972 | Howard et al. | 235/383 |
| 4,792,018 | 12/1988 | Humble et al. | 235/383 |
| 4,841,442 | 6/1989 | Hosoyama | 364/405 |
| 5,162,639 | 11/1992 | Sugiyama | 235/383 |

FOREIGN PATENT DOCUMENTS

58-105375  6/1983  Japan ................... 364/405

Primary Examiner—Andrew M. Dolinar
Attorney, Agent, or Firm—Robin, Blecker, Daley & Driscoll

[57] ABSTRACT

A system for processing articles selected for purchase and bearing an identification code, comprises a code reader for generating output signals indicative of the article identification codes, a first storage unit for storage, for each of the articles, of a signal indicative of a price for the article correlated with the article identification, a second storage unit selectively operable for temporary storage of a signal indicative of a price for an article selected for purchase correlated with the article identification, and a control unit operable on receipt of the code reader output signals for fetching the price-indicative signal from the first storage unit, selectively operable on failure of the price fetching from the first storage unit for accepting operator input of a price-indicative signal for the article and storing the operator input signal in the second storage unit, and for fetching the price-indicative signal for the article from the second storage unit until such time as a price-indicative signal for the acceptable article is fetchable from the first storage unit.

16 Claims, 6 Drawing Sheets

ARTICLE CHECKOUT SYSTEM WITH PRICE PARAMETER OVERRIDE CAPACITY

FIELD OF THE INVENTION

This invention relates generally to systems for the checkout of articles selected for purchase and pertains more particularly to so-called "operator-unattended" article checkout systems.

BACKGROUND OF THE INVENTION

U.S. Pat. Nos. 4,676,343 and 4,792,018, commonly-assigned herewith, set forth systems for operator-unattended checkout with particular concern for detection of customer fraud and deterrence of the same.

In the '343 patent, an article selected for purchase has its universal product code (UPC) scanned by a code reader and the code reader output signals effect the fetching from storage of a signal indicative of a measurable characteristic of the article. The article is placed on a conveyor and led thereby into a security zone defined by inlet and outlet light curtains. In the security zone, the measurable characteristic of the selected article is measured by a sensor and the sensor provides an output signal indicative of the measurement. A comparison is made of the sensor output signal and the fetched signal and, if the comparison is favorable, the conveyor continues to move in an article acceptance sense. Should the comparison be negative, the movement of the conveyor is reversed and the article placed on the conveyor is returned to the customer.

The system thus detects and rejects customer fraud in substituting a more expensive article having diverse characteristics from those of the article scanned for UPC. Beyond the described anti-fraud facility, conveyor movement is reversed on violations of the security zone, as by efforts of a customer to reach into the security zone to substitute articles.

In the '018 patent, various security-related improvements are disclosed, one of which is the reconfiguration of the inlet light curtain to sense the size of a selected article in addition to the role of the curtain in guarding the security zone from fraudulent customer interaction. While the '343 patent contemplates article size also as a measurable article characteristic, the '018 patent discloses the capacity for providing the measured article size information store itself from the inlet light curtain. Thus, as an article is introduced into the security system, its size, as indicated in signals provided from measurement by the inlet light curtain, is storable in the system data base for security purposes. The same may be said of the weight scale in the security zone, i.e., the systems of the commonly-assigned patents may look to weight or size as the measured article characteristic, or jointly to both such security parameters.

While the commonly-assigned patents describe their systems as operator-unattended, practical implementation thereof has led to a re-characterization thereof as systems requiring limited operator assistance, vastly less than the conventional, fully operator-attended systems theretofore known. Typically, an employee is assigned to a prescribed number of checkout counters and floats therebetween as assistance is required.

In typical current implementations of checkout systems in accordance with the commonly-assigned patents, on completion of the activity of the security system, indication is provided by the security system to a POS (point of sale) system of the installation of the acceptance of a given UPC-scanned article selected for purchase. The indication is conveyed to an interface which mates the security and POS systems. The POS system includes a store of article prices correlated with UPC indications and is responsive to the acceptance indication and the UPC indication for a given article to fetch the stored price of the article and to proceed with price totalization for a consumer order, seriatim per selected and accepted article.

One basis for the need for some operator assistance derives from the failure, at times, of the POS system price store to have pricing data for a selected article. In currently implemented systems, the POS system advises the security system, through the interface, of this aberration and the selected article is rejected.

Heightened operator assistance attends the described situation, since all article rejections for failure of price information require ah operator to assist in the checkout. In the described situation, the operator is required to determine the selected article price and to furnish the price by key input to the POS system.

The efficacy of usage of the checkout systems of the commonly-assigned patents manifestly correlates with the minimizing of need for operator assistance. In the described deficiency attending the price failing parameter, efficacy is depleted in that operator assistance is called for repetitively and time-consumingly for each instance of the deficiency, which will occur continuously until such time as the POS price data base is found to have price data.

SUMMARY OF THE INVENTION

The present invention has as its primary object the provision of improved systems of so-called operator-unattended variety.

A more particular object of the invention is to provide for enhanced efficacy of the described systems, specifically in lessening need for operator assistance thereto.

In attaining the foregoing and other objects, the invention provides, in a general aspect, a system for processing articles selected for purchase and bearing an identification code, comprising a code reader for generating output signals indicative of the article identification codes, a first storage unit for storage, for each of the articles, of a signal indicative of a price for the article correlated with the article identification, a second storage unit selectively operable for temporary storage of a signal indicative of a price for an article selected for purchase correlated with the article identification, and a control unit operable on receipt of the code reader output signals for fetching the price-indicative signal from the first storage unit, selectively operable on failure of the price fetching from the first storage unit for accepting operator input of a price-indicative signal for the article and storing the operator input signal in the second storage unit, and for fetching the price-indicative signal for the article from the second storage unit until such time as a price-indicative signal for the acceptable article is fetchable from the first storage unit.

In a more particular aspect, pertaining specifically to so-called operator-unassisted activity, the invention provides a system for processing articles selected for purchase and bearing an identification code, comprising a code reader for generating output signals indicative of the article identification codes, a sensor for generating output signals indicative of measurable characteristics of the articles, a first storage unit for storage, for each of the articles, of a signal indicative of the measurable characteristic thereof correlated with the article identification code, a processor unit for rejecting the selection of an article for purchase on failure of correspondence of the sensor output signal and the corresponding stored measurable characteristic signal and for generating an article acceptance output signal on correspondence of the sensor output signal and the corresponding stored measurable characteristic signal, a second storage unit for storage, for each of the articles, of a signal indicative of a price for the article correlated with the article identification, a temporary storage unit and a control unit operable on receipt of the processor unit article acceptance output signal for fetching the price-indicative signal for the accepted article from the second storage unit, selectively operable on failure of the price fetching from the second storage unit for accepting operator input of a price-indicative signal for the accepted article and storing the operator input signal in the temporary storage unit, and for fetching the price-indicative signal for the accepted article from the temporary storage unit until such time as a price-indicative signal for the acceptable article is fetchable from the second storage unit.

By its configuration, on the absence of article price information in the primary price data base, the system permits an operator to correct matters through the acceptance, under such condition, of an operator price input to the temporary storage unit. Suitable measures, i.e., operator authorization code input, may be taken to insure that the price inputting is indeed authorized. As will be understood, once the price input is effected, article rejection based on failure of available price data will not occur again, since the price data is thus continually thereafter available.

At such time as the primary price data base is provided with article price data, the temporary storage unit is not consulted and may be erased as respects its price data for the article.

The foregoing and other objects and features of the invention will be further understood from the following detailed description of preferred embodiments and practices thereof and from the drawings, wherein like reference numerals identify like components throughout.

DETAILED DESCRIPTION OF PREFERRED EMBODIMENTS AND PRACTICES

Incorporating reference is hereby made to the aforementioned commonly-assigned patents, i.e., U.S Pat. Nos. 4,676,343 and 4,792,018.

Figure 1:
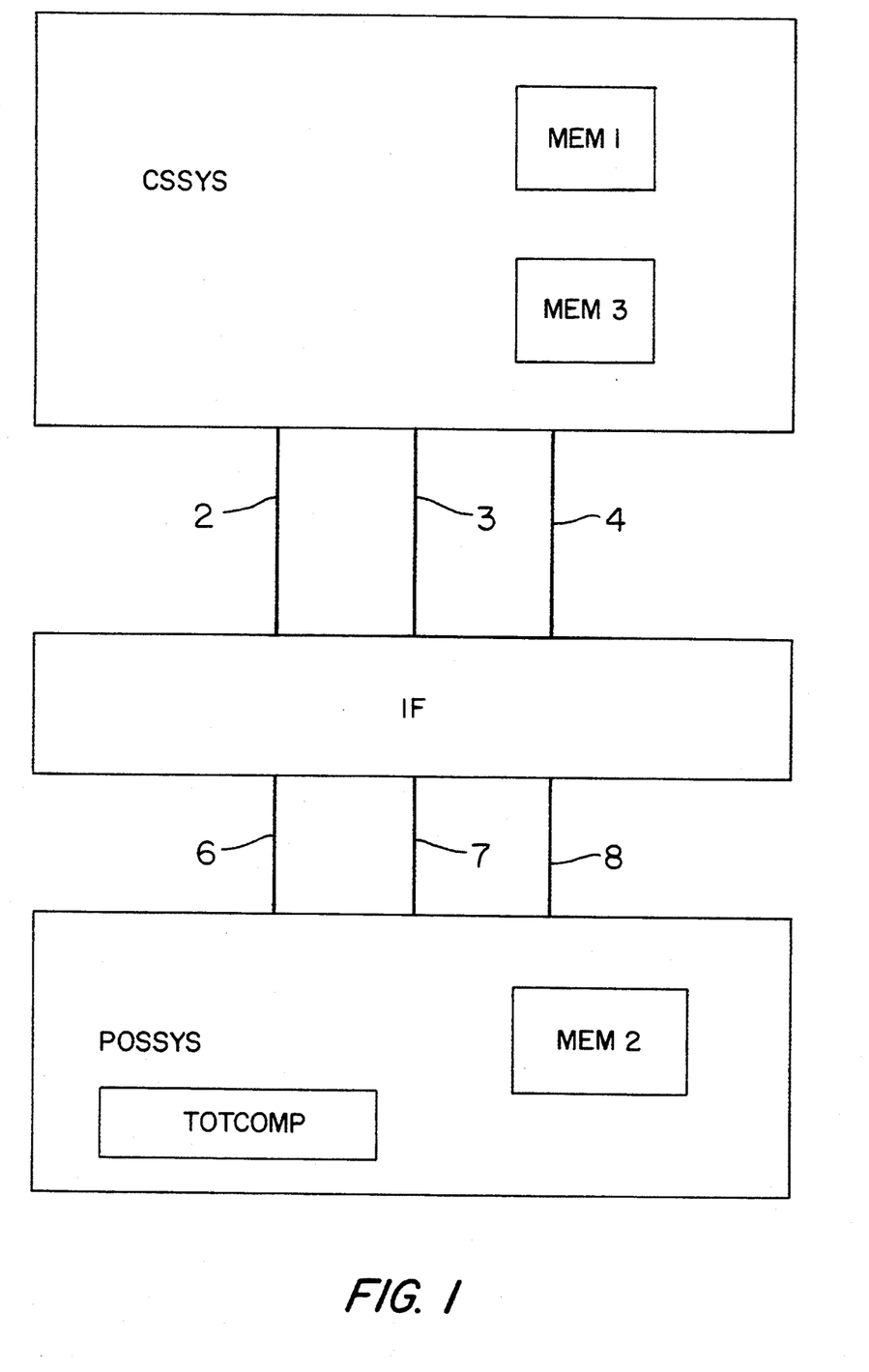
FIG. 1 is a general block diagram of a composite checkout arrangement wherein security parameter storage and temporary article price storage are effected in a checkout security system which is interfaced with a POS system containing the primary article price storage unit.

Referring to FIG. 1, the composite arrangement thereof includes a checkout security system (CSSYS), an embodiment of which is discussed below in connection with FIG. 2, and interface (IF) and a POS system (POSSYS). The checkout security system has a memory or store (MEM1) for the storage of security parameters correlated with article UPC. The POS system incorporates the primary article price storage unit (MEM2). The checkout security system includes a second memory (MEM3) selectively operable for the temporary storage of article price correlated with article UPC. Interconnect lines 2, 3, 4, 6, 7 and 8 tie the FIG. 1 systems and interface IF together.

Except for the second checkout security system memory MEM3, the FIG. 1 arrangement is presently commercially installed, the checkout security system being furnished by the assignee of the subject patent application. The POS system is provided by other parties who have been supplying the same to facilities, such as supermarkets, extensively heretofore for operator-attended checkout and more recently for operator-unattended checkout. In the latter context, need has arisen for the interface IF, which is reached in design jointly by the assignee hereof and such other parties.

In the prior art arrangement, upon successful security processing of an article selected for purchase through the use of security parameters stored in MEM1, the checkout security system advises of article acceptance and of the article UPC by output signals over lines 2, whereupon the interface so advises the POS system over lines 6. Where price data for the subject article is present in MEM2, the POS system proceeds to price totalization in its price computer (TOTCOMP).

As noted above, occasions do arise, undesirably as respects efficacy of checkout, where the POS system is unable to fetch price data from MEM2, either because the price data has not been properly entered in MEM2 or for other failure in the POS system. Thereupon, the POS system so informs the interface by signal provided on line 8 and the interface then so informs the checkout security system by input thereto on line 4.

The checkout security system responds to such interface input by output of an article rejection indication and operator assistance is called for to provide input of the article price, as by finding the same and manually entering it in a keyboard for transmission with UPC indication and other required pricing indication via line 3 back through the interface to the POS system via line 7. The price aberration article rejection continues to occur for the article selected, on all future selections thereof, until the primary price data base is updated or the POS system is otherwise corrected. The efficacy of both operator-attended and operator-unattended systems is accordingly degraded in that there is need for repeated finding and keying in of the article price.

The provision of MEM3 in accordance with the subject invention and related modifications to interfacing provide a solution to the described problem. Per the invention, on the first occurrence of the price aberration, the checkout security system permits operator input of article price and other article pricing indications to MEM3 for temporary storage therein until such time as the primary price data base MEM2 is corrected for its absence or inability to fetch the same. MEM3 is then called on to furnish the stored article pricing data to the interface and to the POS system. On the next occurrence of the line 4 input to the checkout security system, and on all succeeding such events, the security checkout system responds thereto to accept the article in question by furnishing the UPC-correlated price data of MEM3 via line 3 to the interface and thence to the POS system via line 7 which is advised to proceed therewith in lieu of consulting the primary price data base of MEM2.

Figure 2:
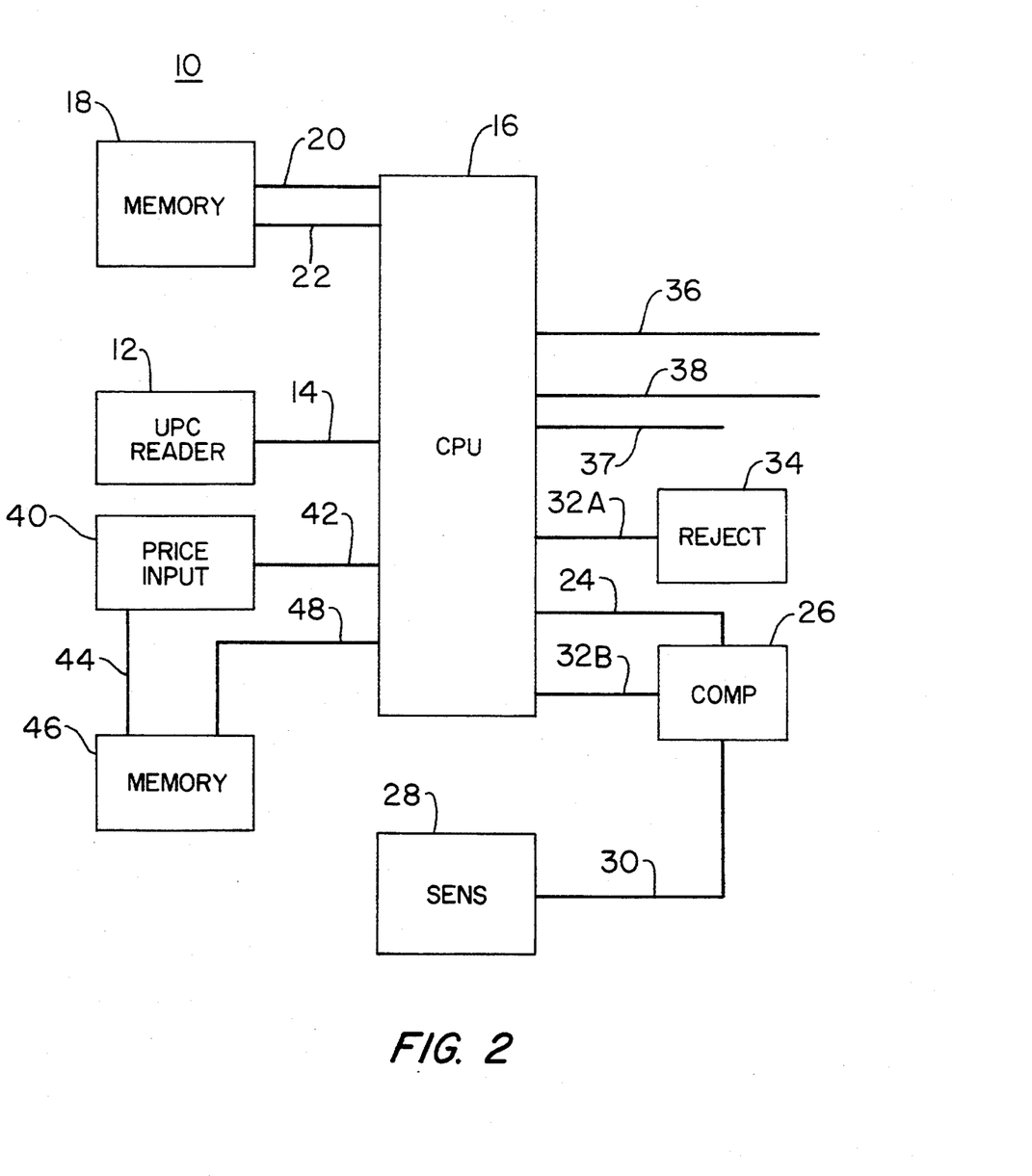
FIG. 2 is a block diagram of a checkout security system for use in the FIG. 1 arrangement.

Turning now to FIG. 2, a checkout security system is described. Checkout system 10 is adapted for the processing of articles selected for purchase and bearing an identification code, typically the well-known universal product code (UPC).

System 10 includes UPC reader 12, which may be a known scanner for the reading of article UPC and generating output signals indicative of the article UPC on line 14.

A central processor (CPU) 16 is provided for implementing the program discussed below in connection with the flowchart of FIG. 3 and receives the line 14 signal as an input.

CPU 16 has further connection with memory 18 (MEM1 of FIG. 1) over lines 20 and 22. Memory 18 provides therein storage, for each of the system articles, a signal indicative of a measurable characteristic thereof correlated with the article identification code.

By a fetch signal on line 20 to memory 18, CPU 16 is responsive to receipt of each of the UPC reader output signals on line 14 to fetch from memory 18 on return line 22 the stored signal indicative of the measurable characteristic correlated with the article identification code. The fetched measurable characteristic signal is furnished by CPU 16 over line 24 to comparator (COMP) 26.

Selected article measurable characteristic sensor (SENS) 28 furnishes a signal over line 30 to comparator 26, the signal being indicative of the measured article characteristic.

By a signal provided on line 32A, responsively to comparison failure indicated by comparator 26 on line 32B, CPU 16 informs selection rejector (REJECT) 34 of the need to reject the present sale, e.g., of the need to reverse conveyor movement and return the article to the customer. Where the comparison of stored and measured article characteristic is affirmative, CPU 16 does not provide such rejection output on line 32A and progress is to the next selected article.

By a signal output by CPU 16 on lines 36 of FIG. 2 to lines 2 of FIG. 1, the checkout security system indicates article acceptance and article UPC indication. When CPU 16 thereafter receives an input on line 38 from line 4 of FIG. 1 indicative of POS failure on price data, CPU 16 enables price input unit (PRICE INPUT) 40 over line 42 to accept operator input price for the UPC at hand. Price input unit 40 furnishes signals indicative of the input price and other required pricing indication over line 44 to temporary storage memory 46 (MEM3 of FIG. 1) where it is stored with UPC correlation.

Memory 46 is connected to CPU 16 over lines 48, whereby CPU 16 is operative to fetch article price therefrom for the UPC at hand for the present line 38/line 4 input, and all future such inputs, and to output on line 37/line 3 the applicable price data.

If desired, CPU 16 may implement a subroutine for each processed UPC whereby it looks to the absence of a price interrupt line 38/line 4 input for the UPC to erase correlated price content of memory 46, for housekeeping purposes.

Figure 3A:
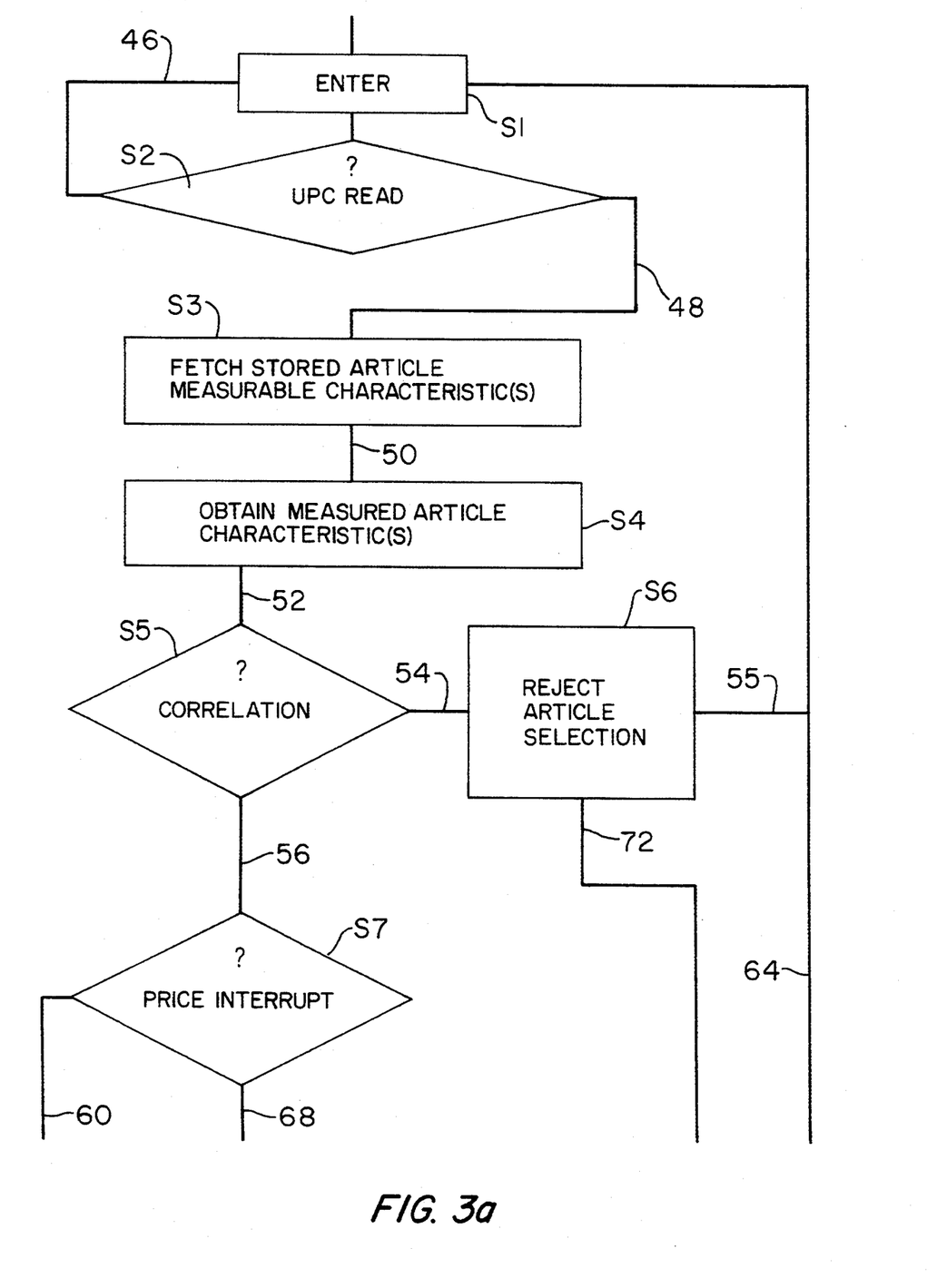
FIGS. 3a–3c depict a flow chart of a program implemented by the CPU of FIG. 2.
Figure 3B:
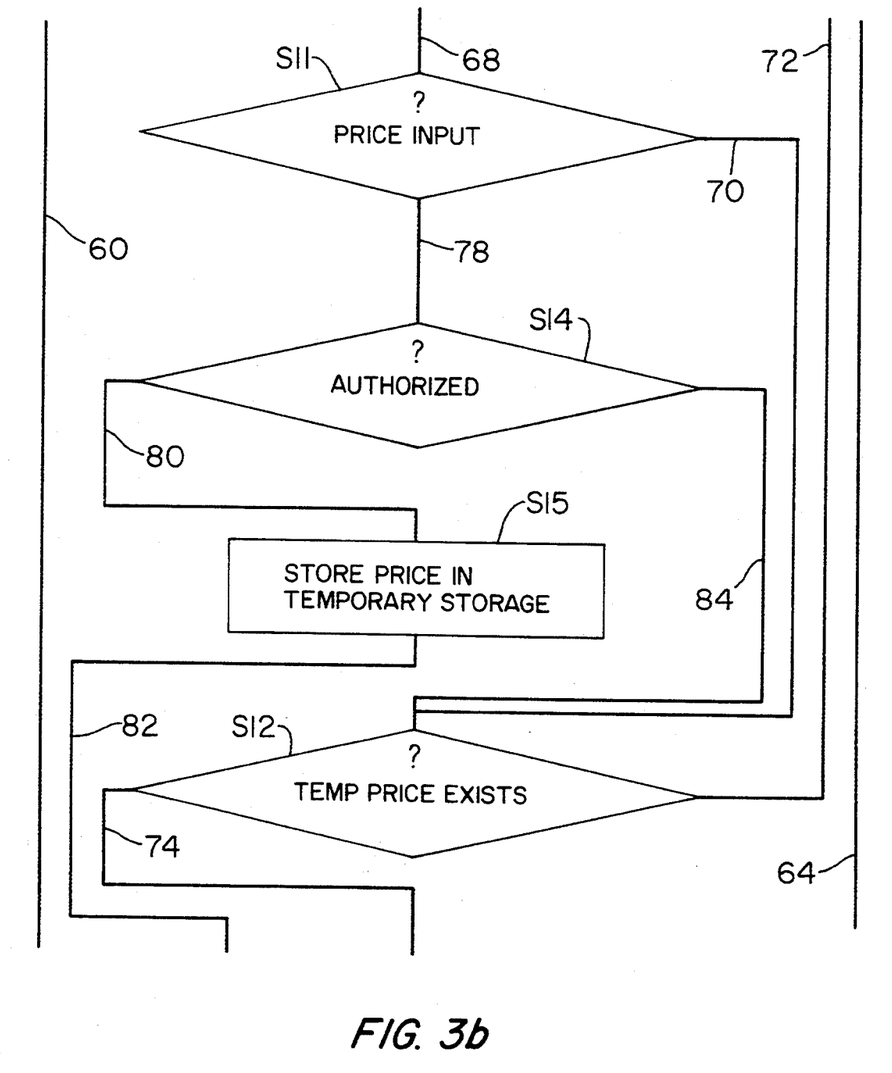
Figure 3C:
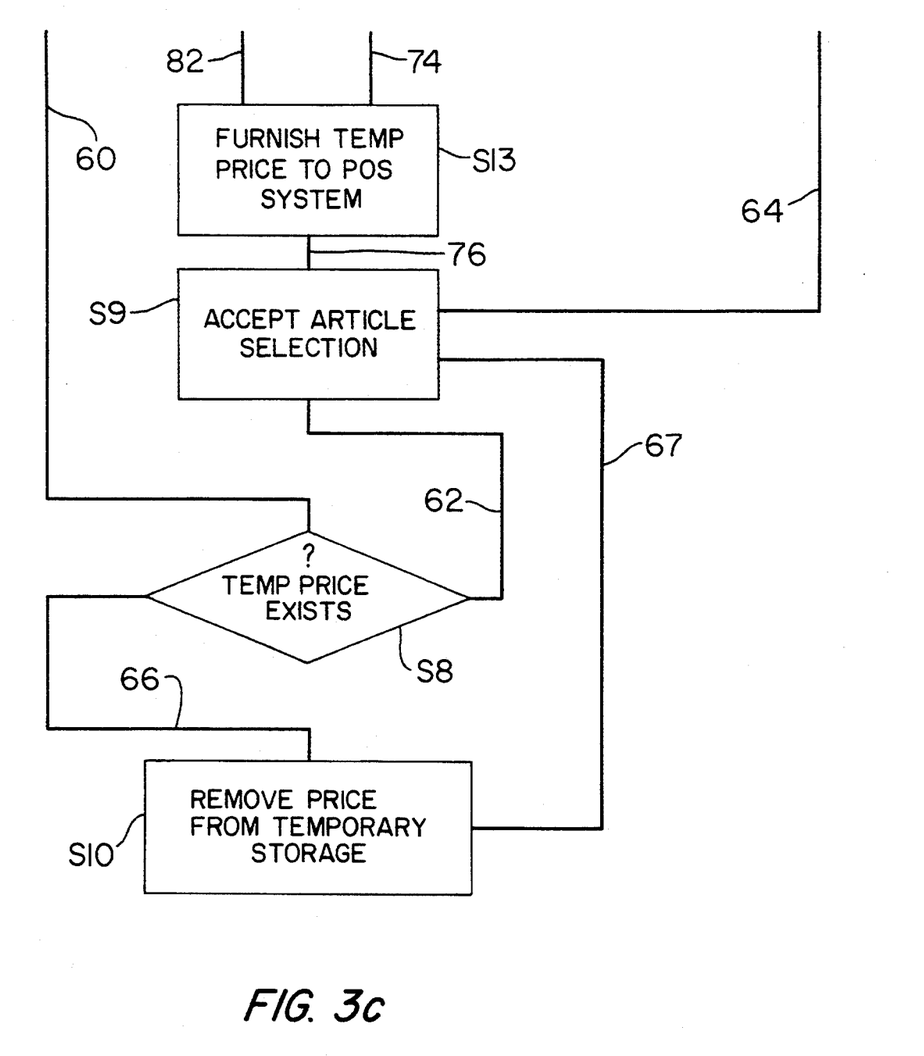

Turning now to FIGS. 3a-3c, a flowchart for operation of CPU 16 is reached through ENTER step S1 and proceeds therefrom to step S2 - ? UPC READ -. If the article identification code has not been read, the program cycles through line 46. On the other hand, if the article identification has been read, progress is over line 48 to step S3 - FETCH STORED ARTICLE MEASURABLE CHARACTERISTIC(S) -, which may be weight, size or both such parameters. Progress is over line 50 to step S4 - OBTAIN MEASURED ARTICLE CHARACTERISTIC(S).

The program next proceeds over line 52 to step S5 - ? CORRELATION -. If correlation is not found in step S5, progress is over line 54 to step S6 - REJECT ARTICLE SELECTION and thence over line 55 to step S1.

If correlation is found, progress is over line 56 to step S7 - ? PRICE INTERRUPT -. If there is no POS price interrupt, i.e., no fault occurred in POS price processing, progress is over line 60 to step S8 - ? TEMP PRICE EXISTS -.

If the answer to the step S8 inquiry is negative, progress is over line 62 to step S9 - ACCEPT ARTICLE SELECTION - and thence over line 64 to step S9.

If the answer to the step S8 inquiry is in the affirmative, progress is over line 66 to step S10 - REMOVE TEMPORARY PRICE FROM TEMPORARY STORAGE - and thence over line 67 to step S9 and to step S9 over line 64.

If the answer to the step S7 inquiry is in the affirmative, progress is over line 68 to step S11 - ? PRICE INPUT -. If the answer to the step S11 inquiry is in the negative, progress is over line 70 to step S12 - ? TEMPORARY PRICE EXISTS -. If the answer to the step S12 inquiry is negative, progress is over line 72 to step S6 and thence over line 55 to step S7.

If the answer to the step S12 inquiry is in the affirmative, progress is over line 74 to step S13 - FURNISH TEMP PRICE TO POS SYSTEM - and thence over line 76 to step S9.

If the answer to the step S11 inquiry is affirmative, progress is over line 78 to step S14 - ? AUTHORIZED -. If the answer to the step S14 inquiry is affirmative, progress is over line 80 to step S15 - STORE PRICE IN TEMPORARY STORAGE - and thence over line 82 to step S13.

Should the answer to the step S14 inquiry be negative, progress is over line 84 to step S12, with above discussed results.

Per the method inherent in the flowchart defined by FIGS. 3a-3c, the invention at hand looks to outset steps of reading UPC, then fetching stored article measurable characteristics, then obtaining measured article characteristics and then looking to whether there is a correlation between the stored and measured article characteristics. If these steps lead to failure of correlation, the article selection is rejected, as in the referenced and commonly-assigned patents.

However, on the event of correlation, the practice at hand then inquires as to whether there is a price interrupt, brought on by failure of pricing information availability. If there is a price interrupt, the method looks to price input occurrence and authorization therefor. If there is an authorized price input, the invention stores the price input in temporary storage and furnishes the price input to the POS system and accepts the article selection.

If there is a price interrupt but there is either no price input or an unauthorized price input, the method looks to whether a temporary price exists. If there is a temporary price available, the method proceeds to use the same and to accept the article, otherwise to reject the article selection.

Further, should there be a failure of price interruption following correlation of stored and measured article characteristics, the invention inquires as to whether a temporary price exists. If so, the method at hand recognizes that such temporary price information is no longer needed and erases it from temporary storage.

Figure 4:
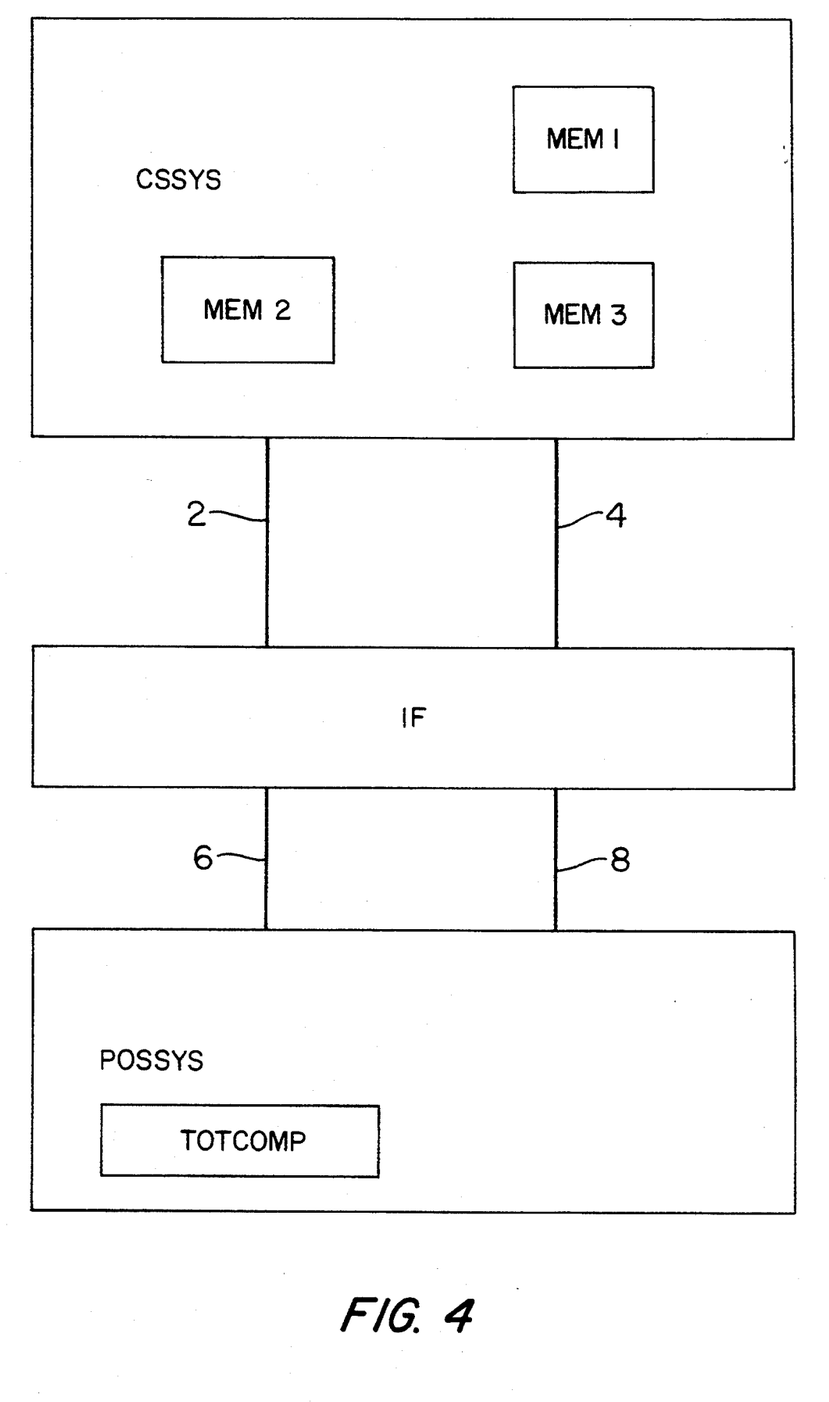
FIG. 4 is a block diagram of a further composite checkout arrangement in accordance with the invention, wherein the article price function of the POS system of FIG. 1 is incorporated in the checkout security system.

Referring now to FIG. 4, the composite arrangement therein will be seen to replicate the FIG. 1 showing, other than for the transposition of MEM2 from the POS system to the checkout security System. In this arrangement, the primary price data base storage unit is incorporated in the checkout security system, which is thereby adapted to provide to the POS system, on article acceptance, both indication of acceptance and price information. The interface is accordingly simplified, as is the structure of the POS system, i.e., the line 8/line 4 interrupts to the checkout security system are not based on failure of price processing in the POS system since this function is now a part of the checkout security system processing. In the FIG. 4 system, should price data not be available in the primary price date storage unit MEM2, following article acceptance from comparison based on the contents of security parameter storage unit MEM1, CPU 16 interprets this as the equivalent of the POS system interrupt of step S7 above and proceeds directly to consult temporary storage unit MEM3 for its storage and, if unsuccessful in that respect, to enable price storage following the flow chart of FIGS. 3a–3c.

While the invention has been discussed in the particular context of operator-unattended environments, as reconsidered to be limited operator-attended environments, it need be appreciated as having substantially broader application, namely, in improving the efficacy of fully-operator-attended environments. Thus, in the customary fully-operator-attended systems, it is likewise customary for efficacy to be degraded by the need for repetitive manual keying in of price information where the primary price data base is deficient in its price storage. The inclusion of temporary price data storage and associated interface modifications in such customary checkout systems is accordingly contemplated by the subject invention.

Methods in accordance with the invention encompass, in broad aspect a method for the checkout of articles selected for purchase and bearing a readable identification code, comprising the steps of providing a first store of signals indicative of article prices cross-correlated with article identification codes, providing a second store for the storage of operator input price-indicative article signals with cross-correlation to the identification code for an article having price-indicative article signals stored therein, reading the identification code for an article selected for purchase and consulting the first store for price therefor and providing price from said first store, permitting, on failure of performance of obtaining price from the first store, operator input of article price to the second store, and consulting said second store for price on each further failure of obtaining price from the first store.

Such method may include the further step of conditioning practice of consulting the first store on operator input of a predetermined access signal.

The method may include, jointly or separably with the conditioning step, the further step of providing a third store of signals indicative of article measurable characteristics cross-correlated with article identification codes, and of affirming that measured characteristics of an article selected for purchase correspond to the characteristics in the third store signals prior to permitting said consulting of the first store for price.

Various changes in structure to the described checkout system and modifications in use thereof may evidently be introduced without departing from the invention. Accordingly, it is to be understood that the particularly disclosed and depicted embodiments are intended in an illustrative and not in a limiting sense. The true spirit and scope of the invention is set forth in the following claims.

What is claimed is:

1. A system for processing articles selected for purchase and bearing an identification code, comprising:
    (a) code reader means for generating output signals indicative of said article identification codes;
    (b) sensing means for generating output signals indicative of measurable characteristics of said articles;
    (c) first storage means for storage, for each of said articles, a signal indicative of said measurable characteristic thereof correlated with the article identification code;
    (d) processor means for rejecting the selection of an article for purchase on failure of correspondence of said sensing means output signal and the corresponding stored measurable characteristic signal and for generating an output signal on correspondence of said sensing means output signal and the corresponding stored measurable characteristic signal;
    (e) second storage means for storage, for each of said articles, a signal indicative of a price for said article correlated with the article identification;
    (f) a temporary storage unit;
    (g) first fetching means for fetching from said second storage means a signal indicative of article price corresponding to the article identification code indicated in an output signal of said code reader means;
    (e) second fetching means for fetching from said temporary storage unit a signal indicative of article price corresponding to the article identification code indicated in an output signal of said code reader means; and
    (f) control means operable on receipt of said processor means output signal for causing said first fetching means to fetch a signal indicative of article price corresponding to the article identification code indicated in an output signal of said code reader means from said first storage means and, operable on failure of the fetching for accepting operator input of a price-indicative signal for said article and storing the operator input price-indicative signal in said temporary storage unit correlated with the article identification code for said article, and for then causing said second fetching means to fetch the price-indicative signal for said article from said temporary storage unit upon subsequent failure of fetching a price-indicative signal for said article from said second storage means by said first fetching means.

2. The invention claimed in claim 1 wherein said sensing means generates said output signals thereof as indicative of article size.

3. The invention claimed in claim 1 wherein said sensing means generates said output signals thereof as indicative of article weight.

4. A method for the checkout of articles selected for purchase and bearing a readable identification code, comprising the steps of:
   (a) providing a first store of signals indicative of article prices cross-correlated with article identification codes;
   (b) providing a second store for the storage of operator input price-indicative article signals with cross-correlation to the identification code for an article having price-indicative article signals stored therein;
   (c) reading the identification code for an article selected for purchase and consulting said first store for price therefor and providing price from said first store;
   (d) permitting, on failure of performance of said step (c), operator input of article price to said second store; and
   (e) consulting said second store for price on each further failure of performance of said step (c) until such time as said step (c) is performed without failure.

5. The invention claimed in claim 4 including the further step of conditioning practice of said step (d) on operator input of a predetermined access signal following performance of said step (c) and failure thereof.

6. The invention claimed in claim 4 including the further steps, practice of which precedes practice of said consulting of said first store for price, of providing a third store of signals indicative of article measurable characteristics cross-correlated with article identification codes, and of affirming that measured characteristics of an article selected for purchase correspond to the characteristics in said third store signals prior to permitting said consulting of said first store for price.

7. The invention claimed in claim 6 including the further step of conditioning practice of said step (d) on operator input of a predetermined access signal following performance of said step (c) and failure thereof.

8. In a method for the checkout of articles selected for purchase and having article identification codes thereon, the steps of:
   (a) providing first and second facilities for storage of article price correlated with article identification code;
   (b) loading said first storage facility with article price information for less than all of said articles;
   (c) inquiring as to whether there is a price interrupt, brought on by failure of pricing information availability from the first storage facility for a given selected article;
   (d) upon affirmative answer to the inquiry of step (c), inquiring as to whether there is an occurrence of operator input of the unavailable pricing information for the given selected article;
   (e) upon affirmative answer to the inquiry of step (d), temporarily storing the pricing information input in the second storage facility; and
   (f) fetching the temporarily stored pricing information in the second storage facility for checkout of articles selected for purchase upon subsequent failure of fetching of pricing information for the given selected article from said first storage facility.

9. The invention claimed in claim 8 wherein practice of step (e) is conditioned on the prior practice of a step of inquiring as to whether the practice of step (d) is authorized.

10. The invention claimed in claim 8, wherein, upon negative answer to the inquiry of step (c), pricing information stored in the second storage facility for the given selected article is removed therefrom.

11. The invention claimed in claim 10 wherein practice of step (e) is conditioned on the prior practice of a step of inquiring as to whether the practice of step (d) is authorized.

12. The invention claimed in claim 8 wherein, upon affirmative answer to the inquiry of step (c) attended by negative answer to the inquiry of step (d), inquiry is made as to the presence of pricing information in temporary storage and if answered in the negative, the article selection is rejected.

13. The invention claimed in claim 12 wherein practice of step (e) is conditioned on the prior practice of a step of inquiring as to whether the practice of step (d) is authorized.

14. The invention claimed in claim 8 wherein, upon affirmative answer to the inquiry of step (c) attended by negative answer to the inquiry of step (d), inquiry is made as to the presence of pricing information in temporary storage and if answered in the affirmative, the article selection is accepted.

15. The invention claimed in claim 14 wherein practice of step (e) is conditioned on the prior practice of a step of inquiring as to whether the practice of step (d) is authorized.

16. A system for processing articles selected for purchase and bearing an identification code, comprising:
   (a) code reader means for generating output signals indicative of said article identification codes;
   (b) first storage means for storage, for each of said articles, of a signal indicative of a price for said article correlated with the article identification codes;
   (c) second storage means selectively operable for storage of a signal indicative of a price for an article selected for purchase correlated with the article identification code;
   (d) first fetching means for fetching from said first storage means a signal indicative of article price corresponding to the article identification code indicated in an output signal of said code reader means;
   (e) second fetching means for fetching from said second storage means a signal indicative of article price corresponding to the article identification code indicated in an output signal of said code reader means; and
   (f) control means for causing said first fetching means fetch a signal indicative of article price corresponding to the article identification code indicated in an output signal of said code reader means from said first storage means and operable on failure of the fetching from said first storage means for accepting operator input of a price-indicative signal for said article and storing the operator input price-indicative signal in said second storage means correlated with the article identification code for said article, and for then causing said second fetching means to fetch the price-indicative signal for said article from said second storage means upon subsequent failure of fetching a price-indicative signal for said article from said first storage means by said first fetching means.

* * * * *